Nov. 27, 1934.  H. A. WEINLICH ET AL  1,981,977
SUBTRACTING DEVICE
Filed Jan. 26, 1933  4 Sheets-Sheet 1

INVENTORS
Hermann A. Weinlich
Ulrich Köhn
BY
ATTORNEY

FIG.4.
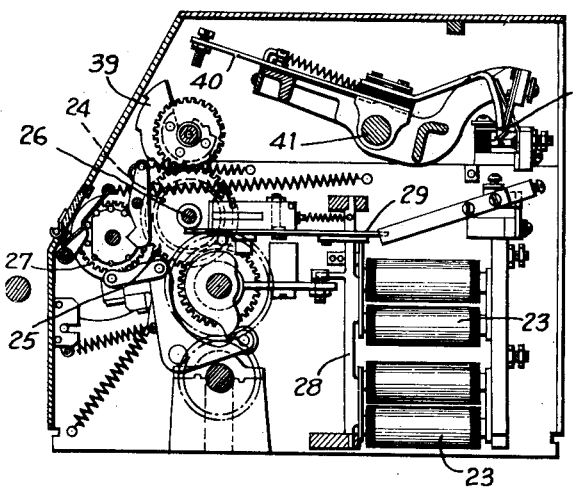
FIG.5.
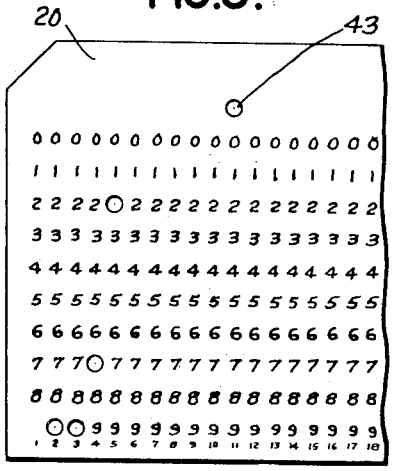
FIG.6.
| | 1<br>DEBIT BAL.<br>ACCUMULATOR | 2<br>DEBIT ITEM<br>ACCUMULATOR | 3<br>CREDIT ITEM<br>ACCUMULATOR | 4<br>CREDIT BAL.<br>ACCUMULATOR |
|---|---|---|---|---|
| | 0016 | 0016 | | 0016 |
| | 0021 | 0021 | | 0021 |
| BAL TEST | 9992+1 | | 9992 | 9992 |
| | 9985+1 | | 9985+1 | 9985+1 |
| WHEELS INDICATE | 0016 | 0037 | 9978 | 0015 |
| PRINT | 0016 | 0037 | 0021 | |
| | | | | |
| | 9972+1 | | 9972 | 9972 |
| | 9956+1 | | 9956+1 | 9956+1 |
| BAL TEST | 0018 | 0018 | | 0018 |
| | 0023 | 0023 | | 0023 |
| WHEELS INDICATE | 9971 | 0041 | 9929 | 9970 |
| PRINT | | 0041 | 0070 | 0029 |
INVENTORS
*Hermann A. Weinlich*
*Ulrich Kühn*
BY
*W. M. Wilson*
ATTORNEY- Nov. 27, 1934.   H. A. WEINLICH ET AL   1,981,977
SUBTRACTING DEVICE
Filed Jan. 26, 1933   4 Sheets-Sheet 3

Patented Nov. 27, 1934

1,981,977

UNITED STATES PATENT OFFICE 1,981,977

SUBTRACTING DEVICE

Hermann A. Weinlich, Berlin-Charlottenburg, and Ulrich Kölm, Berlin-Lankwitz, Germany, assignors, by mesne assignments, to International Business Machines Corporation, New York, N. Y., a corporation of New York Application January 26, 1933, Serial No. 653,624

10 Claims. (Cl. 235—92)

This invention relates generally to improvements in accumulating devices and more specifically to record controlled subtraction devices which are adapted to receive credit and debit item entries, compute the balance and print a record of the classified totals and said balance.

The machine is illustrated as having four counters or accumulators; a debit item accumulator, a credit item accumulator, a debit balance accumulator and a credit balance accumulator. Amounts are entered into the accumulators under control of sensing devices cooperating with perforated record cards. A debit item is represented on a card by perforations indicating a true number equal to the debit amount. A credit item is carried on a card with a special perforation and amount perforations representing the nines complement of the credit amount. The balance accumulators are connected to the sensing devices so that true amounts of debit items and nines complements of credit amounts are entered into both accumulators from one field of the sensing devices. The item accumulators are selectively connected to the same field so that debit cards control the debit item accumulator to enter true debit amounts therein; and the credit cards control the credit item accumulator to enter the nines complements of the credit amounts. The selective connection of one or the other item accumulator to the sensing devices is controlled by the special perforation in the credit card. The same perforation partially controls the entry of elusive units with the nines complements entered into the debit and credit balance accumulators and the credit item accumulator when the item entered is a credit. Means is provided for further controlling the entry of the elusive units so that a unit is not entered into the credit item and credit balance accumulators as an incident to the entry of the first credit item of a series of items. All the other credit items of the series are accompanied with the entry of elusive units. This is done because the type bars associated with the credit accumulators are arranged to print the nines complement of the reading of the accumulator wheels.

The nines complement relationship is maintained by entering the nines complement of the first credit item and the tens complements of the other following credit items. The debit balance accumulator receives elusive unit entries with every credit item including the first. Thus the tens complement of every credit item is added on the debit balance accumulator. This is done because the type of the type bars associated with the debit balance accumulator are arranged in the ordinary way to total print a number similar to the amount registered on the accumulator wheels; i. e., if the amount is a true amount. If the amount happens to be a tens complement of the balance, the highest order debit balance accumulator wheels stands at nine, and devices under control of the wheel, shift the total printing connections so that the total or balance is printed by the complementary type under control of the credit balance wheels which hold the credit balance as a nines complement. Thus, by printing the complement of the complement of the credit balance, the true number indicating the balance is impressed on the record sheet.

An object of the invention is to provide subtracting devices including a pair of balance accumulators, one of which is adapted to receive the true numbers of one class of item, the nines complement of one item of another class, and the tens complements of other items of said other class. The other balance accumulator receives true numbers of one class of items and the tens complements of the other class of items. After a series of item entries, either accumulator will hold the balance in readiness for total printing. If the balance is a debit, it appears as a true number in the debit accumulator; if it is a credit, the nines complement of it is present in the credit accumulator.

Another object is to provide means for suppressing the entry of an elusive unit with the complement of the first item of a series of credit items. All the other complements of the credit items which follow are accompanied by the entry of elusive units to retain the nines complement relation of the credit accumulator wheels. The type on the type bars associated with the credit wheels are arranged complementally to the digits on the said wheels, so that if a balance is a credit amount it is represented on the credit wheels as a complement of the amount, but is printed as a true number.

A feature of the invention is the selective electrical control of devices for entering elusive units.

The invention is illustrated by a set of drawings which forms part of this specification. In the drawings:

Fig. 4 is a sectional elevation view of an accumulator and total reading devices.

Fig. 5 is a detail view of a portion of a record card containing a special perforation and amount perforations representing the nines complement of a credit amount.

Fig. 6 is a diagram showing the manner of entering debit and credit amounts in the item and balance accumulators. It also shows the numeral positions of the wheels at total taking time, and the matter printed under control thereof.

Figure 7:
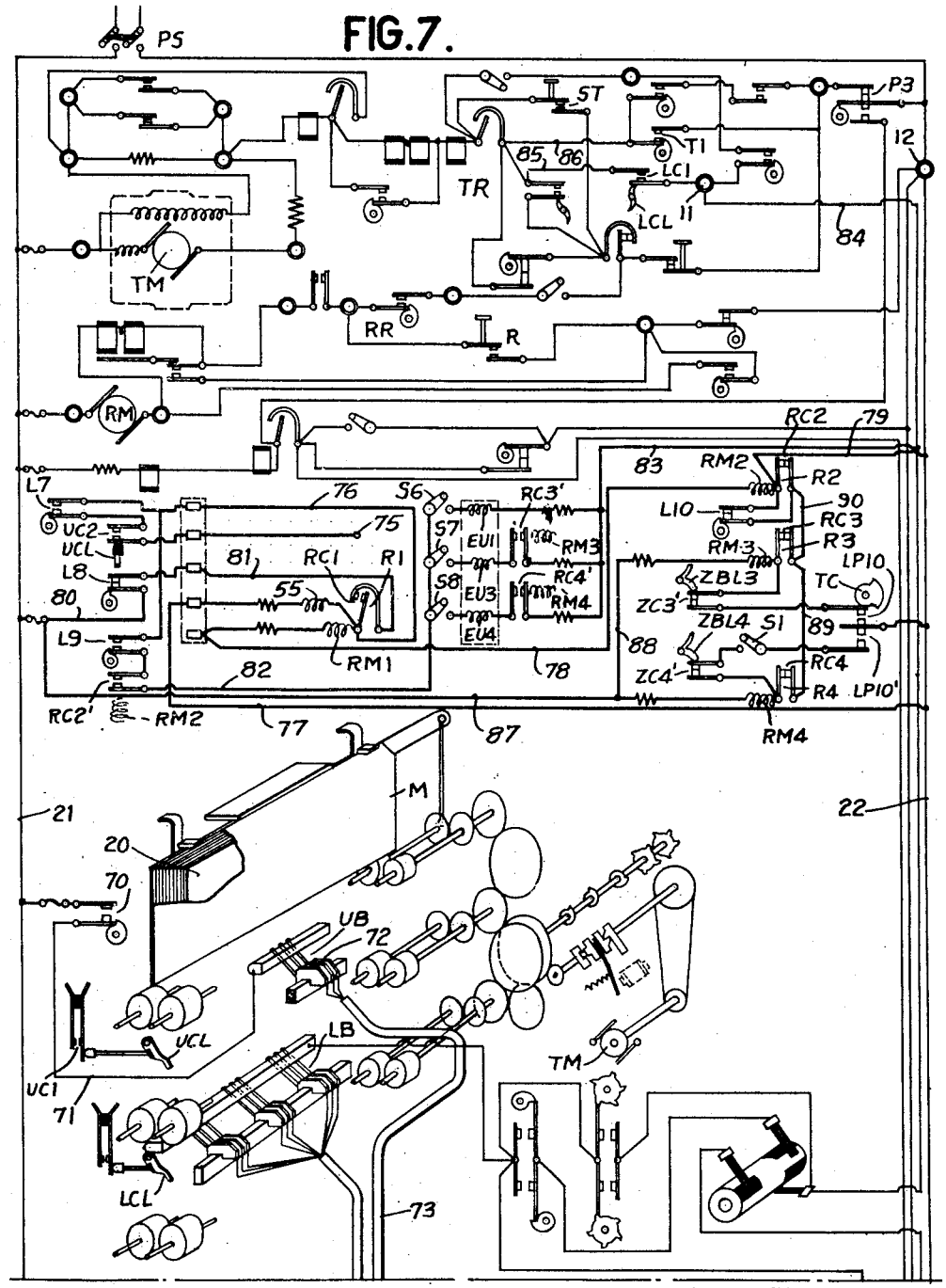
Figure 7A:
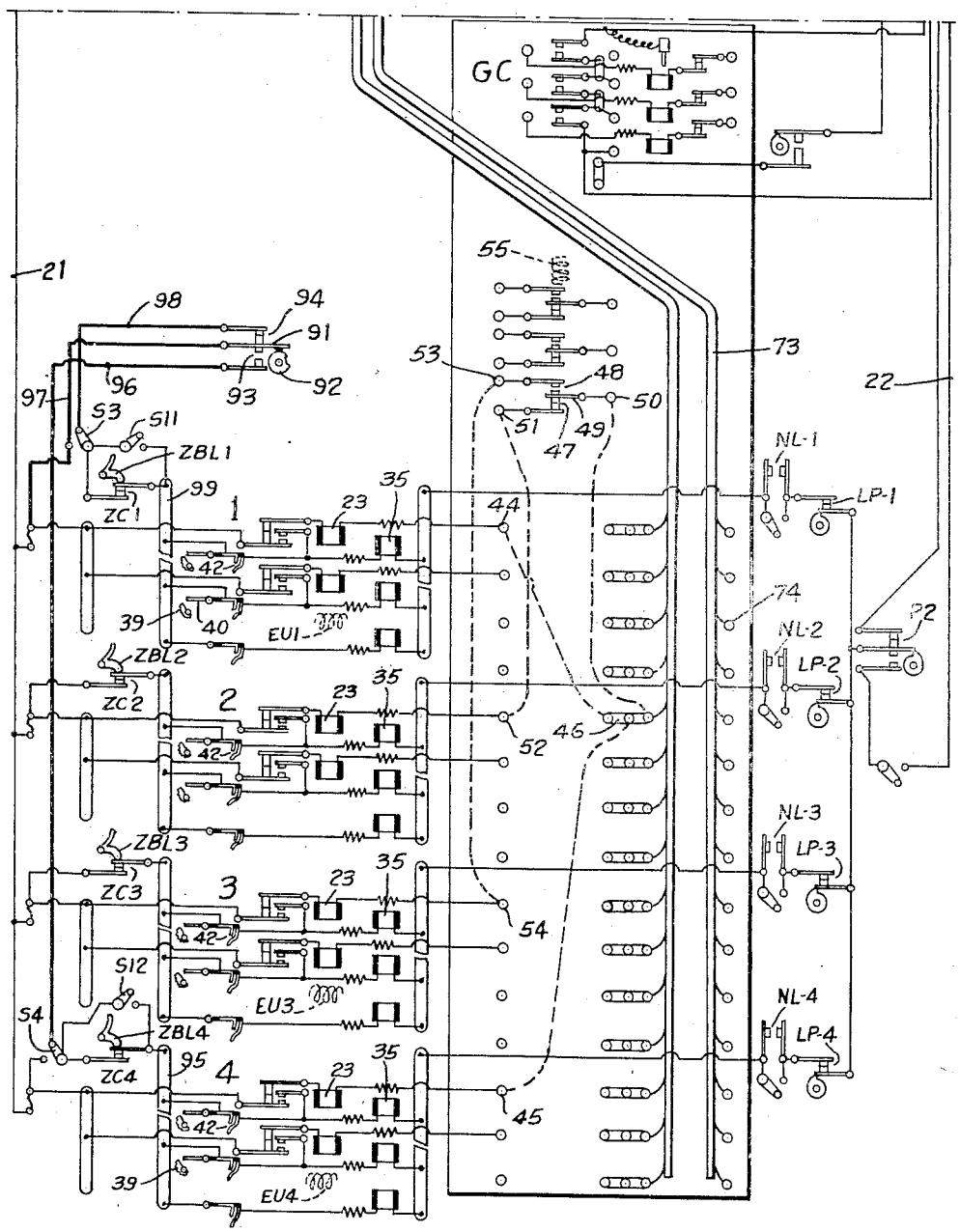

Figs. 7 and 7a together form a wiring diagram of the machine.

Referring to Fig. 7, a tabulating motor TM is provided to operate the machine during accumulating operations. The switch at PS is closed and circuits may then be established through lines 21 and 22. The tabulating motor is controlled through a plurality of circuits, contacts and relays indicated generally at TR, and when operated effects passage of tabulating cards 20, one at a time, from a magazine M causing them to pass beneath the upper or control analyzing brushes UB during one machine cycle and beneath the lower or adding analyzing brushes LB during the following machine cycle.

The tabulating motor may be started in operation by closing start key contacts ST whereupon through the associated relays the tabulating motor continues to operate until a change of card group, if the machine is operating under the automatic group control system indicated at GC (Fig. 7a) or until the cards are exhausted from the magazine if the machine is operating under straight control. At the end of a card group or tabulating run, the tabulating motor TM ceases operation and total taking may be instituted by closing reset contacts R which cause the reset motor RM to start operation and drive the machine during a total taking and reset cycle. The reset motor is controlled by circuits, relays and contacts indicated generally at RR and ceases operation automatically after the total taking and reset operation is complete. The specific operation of the several motor control circuits, contacts and relays is well known and fully described in the U. S. patent granted to G. F. Daly et al. No. 1,762,145, June 10, 1930, and will not be described further herein.

The accumulators each comprise a plurality of accumulator magnets 23 (Figs. 4 and 7a) which, when energized, attract armatures 28 and release levers 29 and clutch members 24 (Fig. 4) to engage the accumulator gears 25 to the accumulator shaft 26 driven by the tabulating motor so that the accumulator wheels 27 are turned through differential amounts. The shaft 26 is rotated in synchronism with the movement of the record card under the lower brushes LB so that when a wheel is connected to the shaft by the energization of the related magnet 23 through the analyzing brush LB, the time of connection is arranged so that the differential movement imparted to the wheel is representative of the value of the perforation in the card sensed by the brush LB. This type of accumulator is well known in the art and need not be described in detail.

Figure 1:
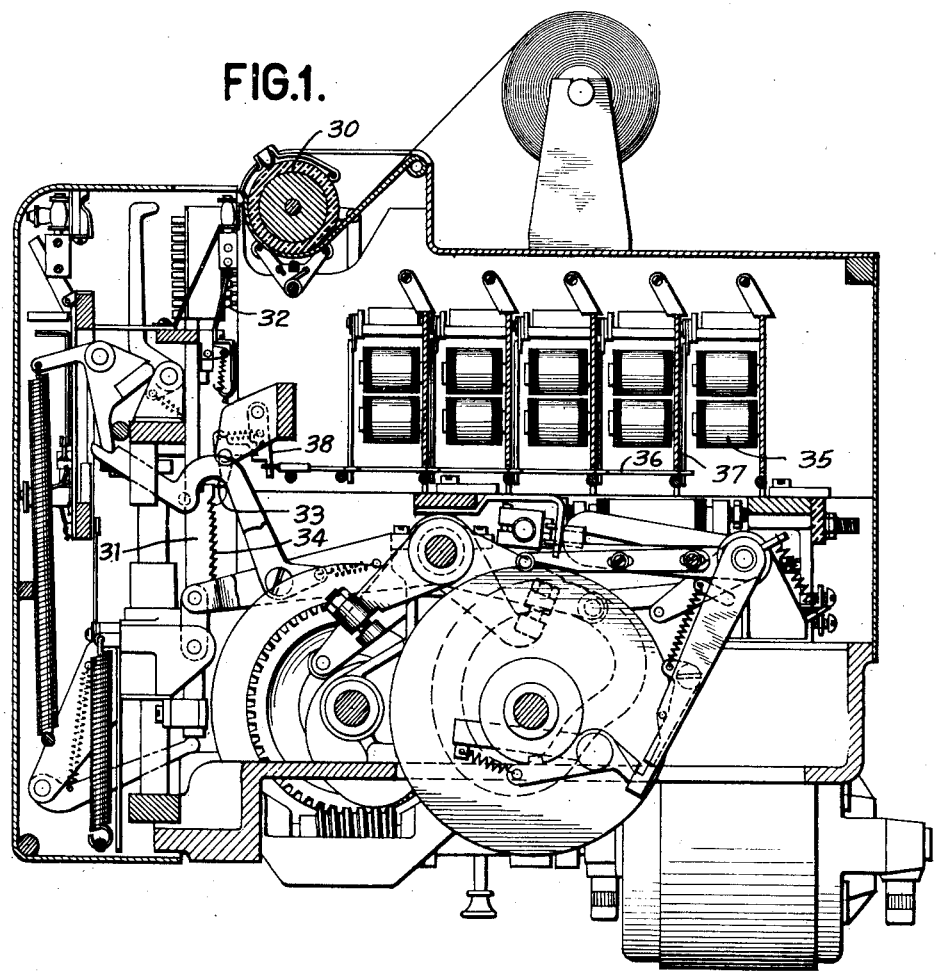
Fig. 1 is a sectional elevation view through the printing section of the machine.
Figure 2:
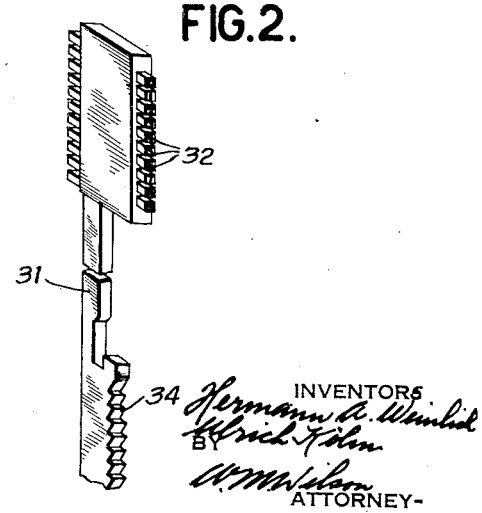
Fig. 2 is a detail view of a type bar with the type arranged complementally to the usual arrangement.

The printing mechanism (Fig. 1) includes a platen 30 past which type bars 31 are raised in synchronism with the feeding of the record card under the lower brushes LB. Each type bar has type 32 for printing the digits nine to zero. The bars associated with the debit accumulators have the type arranged in the usual way with the nine type at the top and the zero at the bottom. But the bars associated with the credit accumulators have the type arranged complementary to the usual positions. As shown on the complemental type bar in Fig. 2, the zero type is at the top and the nine type is at the bottom of the bar. Each type bar 31 may be arrested in position to print a particular digit on a record sheet on the platen by a pawl 33 which is released to engage a rack 34 on the bar by the energization of a printing magnet 35 (Figs. 1 and 7a) when the associated lower brush LB senses a perforation in the card. A call rod 36 connects the armature 37 to the latch 38 holding pawl 33.

The accumulators are provided with total readout mechanism of the well known stepped cam type. Each denominational section in an accumulator includes a stepped cam 39 (Fig. 4) which is positioned in accordance with the digit registered in that denomination of the accumulator. These cams cooperate with a series of levers 40 which are rocked by suitable mechanism from a rock shaft 41. This shaft in turn is moved by connections to the driving means operated by the reset motor RM during total taking operations. The levers 40 are rocked towards the stepped cams in synchronism with the rise of the type bars 31 past the platen. Each lever 40 is arrested after a degree of movement depending on the position of the related stepped cam, and when arrested closes a pair of reading-out contacts 42 (Figs. 4 and 7a). These contacts, as they close, complete circuits to the printing magnets 35 which arrest the type bars 31 in position to print the total.

The record cards 20 used are of the regular Hollerith form. A portion of a record card carrying perforations representing a credit item is shown in Fig. 5. The amount of the item is 27 so the card is perforated in the index point positions 9972 which number is the nines complement of the credit amount. The credit card also carries a special perforation 43 which controls the direction of the item into the credit item accumulator instead of into the debit item accumulator. The perforation 43 also controls the entry of elusive units in a manner more fully described hereinafter. Although the special perforation is shown above the eleventh column in the card shown in Fig. 5, it may be perforated above any column.

The debit cards used to control the machine to enter debit amounts are perforated to represent the true numbers of the amounts. They are not punched with any special perforations. The debit amounts are represented by perforations in the same field of the cards as that used by the credit amounts, the items being selectively distributed in a manner set forth hereinafter.

The arrangement of the four accumulators provided in the machine may be noted in Fig. 7a. The debit balance accumulator 1 and the credit balance accumulator 4 may be plugged to the lower brushes of the sensing devices cooperating with one field on the record card. To do this, plug wires from sockets 44 and 45 may be connected to plug socket 46 leading to the lower brushes.

The debit item accumulator 2 and credit item accumulator 3 are selectively connected to the lower brushes according to the class of the item entered. The class selection devices include normally closed contacts 47 and opened contacts 48. The common contact blade 49 of the devices is connected to the related lower brush LB by a plug wire from socket 50 to socket 46. A plug wire between socket 51 and socket 52 connects the normally closed contacts 49 to an order of the debit item accumulator 2.

Another plug wire is fastened between socket 53 and socket 54 in the credit item accumulator 3. The blades 49 are adapted to be shifted by a magnet 55 to direct impulses representing credit amounts into the credit item accumulator. The control over the energization of magnet 55 is explained hereinafter.

Figure 3:
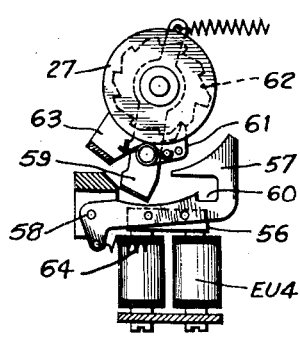
Fig. 3 is a detail view of a units order accumulator wheel and transfer devices with a magnet for controlling the devices to enter an elusive unit on the wheel.

The units orders of all of the accumulators except the debit item accumulator are provided with elusive unit entering devices to add a unit to certain nines complement entries to fill out the same to tens complements. The devices take the form of magnets EU1, EU3 and EU4 cooperating with the transfer devices in the units orders of the accumulators 1, 3 and 4. One of such devices is shown in Fig. 3. There it may be noted that when the magnet EU4 is energized, the armature 56 and the connected latch arm 57 is lowered about pivot 58, releasing lever 59, which is normally held to the right in engagement with notch 60, and drawing pawl 61 over one tooth on the ratchet wheel 62 fastened to the accumulator wheel 27. When the lever 59 is rocked counterclockwise by the restoring movement of the restoring bail 63, the pawl 61 advances the wheel one step, after which the lever 59 is latched by arm 57 and held latched by spring 64. The control over the energization of the magnets EU is explained hereinafter with reference to the wiring diagram in Fig. 7.

The special control devices of the present invention are illustrated by slightly heavier lines on the wiring diagram in Figs. 7 and 7a. By means of these devices, the elusive unit magnet EU1 associated with the debit balance accumulator and magnet 55 used for class selection control are energized with each credit item entry. The other two elusive unit entry magnets EU3 and EU4 associated with the credit accumulators are adapted to be energized with every credit item of a group after the first credit item of said group.

The devices for securing the results mentioned are operated under control of devices for sensing the presence of a perforation 43 (Fig. 5) in a record card denoting a credit entry. This occurs while the card is passing under the upper control brushes UB. The sensing circuit runs from line 21 (Fig. 7), contacts 70, wire 71, the upper brush UB cooperating with the card column containing the special perforation, then through the perforation 43 and contact with a block 72, a wire in cable 73, a plug socket 74 (Fig. 7a), a plug wire to socket 75 (Fig. 7), contact UC2 closed by the upper card lever UCL, contact L7 closed as the special perforation appears under the upper brush, wire 76, and then through two branches of the circuit; one through magnet 55 and wire 77 to line 22, and the other through the magnet coil RM1 of relay R1, wire 78, magnet RM2 of relay R2, and wire 79 to line 22. Relay R1, through contacts RC1, closes a holding circuit for the associated magnet RM1 and at the same time establishes circuits for the magnets 55 and RM2. The connections through the closed contacts RC1 are from the line 21, wire 80, contacts L8 closed except for a brief interval at the time of sensing for a special perforation, wire 81, contacts RC1 and thence through magnets 55, RM1 and RM2 to line 22 over the wires already noted.

When the class selection control magnet 55 is energized it acts to close contacts 48 (Fig. 7a) and open contacts 47, thus directing the amount representing impulses from the lower brushes through the credit item accumulator instead of the debit item accumulator.

The energized relay R2 acts to open the associated contacts RC2 and close the contacts RC2' to prepare for elusive unit entering. Then, as the card passes under the lower brushes LB, the contacts L9 close early in the card reading cycle and the elusive unit entry circuit is established as follows: from line 21, wire 80, contacts L8, wire 81, contacts RC1, wire 76, contacts L9, contacts RC2', wire 82, switch S6, magnet EU1, wire 83 and wire 84 to connection 11, and then through contacts LC1 which are closed as long as cards are under the lower brushes, wires 85 and 86, contacts T1, and contacts P3 to line 22.

Thus the elusive unit magnet of the debit balance accumulator 1 is energized at once, while the elusive unit magnets EU3 and EU4 associated with the credit item accumulator and credit balance accumulator are prevented from being energized by the open contacts RC3' and RC4' in series with the magnets. These contacts are associated with the magnets RM3 and RM4 which are energized before the accumulation of a group of items and, when so energized, hold the contacts opened until deenergized. The magnets are deenergized only after the first credit card of a group passes the lower brushes. The circuit normally holding magnets RM3 and RM4 energized is closed from line 21 through wire 87 then through two parallel lines; one containing wire 88, magnet RM3 and contacts RC3, the other containing magnet RM4, contacts RC4 and wire 89; the circuit then continues through wire 90, contacts RC2 or L10, and wire 79 to the line 22. This circuit is maintained as long as either contact L10 or RC2 is closed. It is noted hereinbefore how contacts RC2 are opened by the sensing of the first credit card. They are held open during the first part of the next cycle by the sustained closure of contacts L8 and the continued energization of magnet RM2. The contacts L10 open momentarily during the first part of every operating cycle. This opening is ineffective if contacts RC2 are closed. However, should contacts RC2 be opened by the sensing of a perforation 43 on any cycle, then on the next cycle when contacts L10 are opened, both contacts RC2 and L10 are opened at the same time. This serves to break the circuit through relays R3 and R4, and the contacts RC3 and RC4 open, and contacts RC3' and RC4' close to condition the magnets EU3 and EU4 for energization on all succeeding credit item entering operations. On each of said succeeding credit operations, the magnets 55, RM1 and RM2 are energized and contacts RC1 and RC2' are closed to complete a circuit through magnets EU3 and EU4. The circuit includes line 21, wire 80, contacts L8, wire 81, contacts RC1, wire 76, contacts L9, contacts RC2', wire 82, then in multiple through switches S7, S8, magnets EU3, EU4 and contacts RC3', RC4', then through wire 83, wire 84, contacts LC1, wires 85 and 86, contacts T1 and P3 to the line 22. Thus, for each credit item entering operation following the first, the magnets EU3 and EU4 are effective to enter elusive units into the credit item and credit balance accumulators.

Once the contacts RC3' and RC4' are closed during the entry of a group of items, they remain closed for the remaining entering operations and are only opened by the energization of relays R3 and R4 on a totaling and resetting operation at the end of the group. The energizing circuit through the relays is closed by a cam TC operated on each total taking and resetting cycle. The circuit includes the following connections from line 22; the contacts LP10 and LP10' closed by cam TC, then through two parallel lines; one including contacts ZC3' closed by the zero button lever ZBL3, magnet RM3 and wire 88, the other line includes switch S1, contacts ZC4' closed by the zero button lever ZBL4 and magnet RM4, both lines are connected to main line 21 through wire 87. When the magnets RM3 and RM4 are so energized, they act to again close contacts RC3 and RC4 and open contacts RC3' and RC4', holding the latter opened until the first credit item breaks the holding circuit by opening RC2 and L10 simultaneously.

Devices are provided to select the balanced accumulator adapted to print the balance as a true number and to disable the other balance accumulator so that during the totaling and resetting cycle, one of the balance accumulators is disconnected from the associated total printing line. To do this, a spring contact member 91 (Fig. 7a) cooperates with a cam 92 mounted on the highest order accumulator wheel 27 (Fig. 4) in the debit balance accumulator 1. If the wheel stands at 9, indicating a complemental amount in the accumulator and a balance in the credit accumulator, a notch in cam 92 allows member 91 to operate and contacts 93 are closed, completing a total printing circuit through contacts 42 in the credit balance accumulator 4, bus bar 95, zero button contacts ZC4, switch S4, wire 96, contacts 93 and wire 97 to line 21. If the wheel and cam 92 stand at 0 or any other number but 9, indicating a true number in the debit balance accumulator, the contacts 94 remain closed, completing a total printing circuit through contacts 42 in the debit balance accumulator, bus bar 99, contacts ZC1, switch S3, wire 98, contacts 94 and wire 97 to line 21. The selective control may be disabled by closing switches S3 and S4; then the balance is printed in two columns as a complement and as a true number.

When the highest order wheel in the debit balance accumulator is used for balance testing or selection, it is understood that the capacity of that accumulator for addition is one order less than the number of orders provided.

The operation of the devices for item entering and balance printing is illustrated by a few examples shown in Fig. 6. There it is noted that the first two items are debit amounts of 16 and 21. They are entered as true numbers in the debit item accumulator and the debit and credit balance accumulators. The next item is a credit amount of 7, so the nines complement or 9992 is entered in three accumulators; the credit item accumulator and the two balance accumulators. The entry in the debit balance accumulator is changed to a tens complement by the addition of an elusive unit. The two credit accumulators fail to receive elusive units because of the operation of the unit entering control device described hereinbefore. Thus, the credit accumulator wheels are set in a nines complement relationship which is maintained throughout the entry of the other items of the group. The fourth item entered, a credit item of 14, is added in the credit item accumulator and the two balance accumulators as the nines complement or 9985. The complement is accompanied by the entry of elusive units in all three accumulators, thus in effect entering the tens complement of the item. At the end of a group of items, the accumulating wheels will indicate the sum of the entries and totals may be printed under control of the stepped cams as described hereinbefore. The selection of the balance accumulator adapted to print the balance as a true number is accomplished automatically by the devices cooperating with the highest order in the debit balance accumulator. In the example on the fifth line of the diagram in Fig. 6, the total is a true amount of 16 in the debit balance accumulator and the highest order wheel stands at zero conditioning the said accumulator for total printing and disabling the credit balance accumulator from printing operation. It is noted in the first two columns of the sixth line that the debit balance 16 and debit item total 37 are identical with the numeral indication of the related accumulator wheels. In the third column, however, the printed credit item total of 21 is the nines complement of the number 9978 appearing on the related accumulator wheels. This corrected printing of the credit total is made possible by the use of type bars with complementary arranged type as explained hereinbefore. The printing of the true numbers of the credit items, even though they are entered as nines complements, is also effected by the same agency.

Another series of items resulting in a credit balance is illustrated in lines seven to ten of Fig. 6. The first item, a credit of 27, is entered as a nines complement in the two credit accumulators, and as a tens complement in the debit balance accumulator. The next credit item of 43 is entered as a tens complement in all three accumulators. The next two debit items are entered as true numbers in the debit accumulators and the credit balance accumulator. The balance resulting from the four items is a credit balance of 29 represented by the nines complement of said amount in the credit balance accumulator and evidenced by the presence of a nine on the highest order wheel of the debit balance accumulator which is then disabled for total printing.

The total printed under control of the debit item accumulator is a true number equal to the sum 41 appearing on the debit wheels. The two credit totals printed are nines complements of the nines complements standing on the credit wheels, resulting in the printing of the true number 70 representing the credit item total and the true number 29 representing the credit balance.

While there is shown and described the novel features of the invention as applied to a single modification it will be understood that various omissions, substitutions and changes in the form and details of the device illustrated and in its operation may be made by those skilled in the art without departing from the spirit of the invention. We intend to be limited therefore only as indicated by the scope of the following claims.

What is claimed is:

1. In a machine of the class described, an accumulator, means for entering true numbers of debit amounts and nines complements of credit amounts into said accumulator, means for entering elusive units into said accumulator with said complements, and means for disabling said unit entering means while the first nines complement is being entered.

2. In a machine of the class described, an accumulator, means for entering true numbers of debit amounts and nines complements of credit amounts into said accumulator, means for entering elusive units into said accumulator with said complements, means for disabling said unit entering means while the first nines complement is being entered, printing devices arranged complementary to said accumulator, and means under control of said accumulator for adjusting said devices, when the credit amounts predominate, to print the nines complement of nines complement contained therein and thus represent the balance as a true number.

3. In a perforated record controlled machine, an accumulator, means under control of amount perforations in said records for entering positive and negative amounts into said accumulator, means for entering the nines complement of one negative amount, and means under control of special perforations in said records for adding the tens complements of all other negative amounts.

4. In a record controlled machine, means for reading a group of records representing debit and credit amounts, an accumulator, means under control of said reading means for entering into said accumulator true numbers representing debit amounts and nines complements representing credit amounts, means for entering elusive units into said accumulator with said complements, and means under control of said reading means for disabling said elusive unit entering means while the first nines complement of a group is being entered.

5. In a record controlled machine, means for reading a group of records representing debit and credit amounts, an accumulator, means under control of said reading means for entering into said accumulator true numbers representing debit amounts and nines complements representing credit amounts, means for entering elusive units into said accumulator with said complements, means under control of said reading means for disabling said elusive unit entering means while the first nines complement of a group is being entered, type members with type arranged complementary to the amount registration of the accumulator, means for adjusting said members under control of the accumulator, means for determining when said accumulator holds a balance in the form of a nines complement, and total taking devices under control of said determining means for printing the balance from said type members.

6. In a machine controlled by grouped record cards perforated to represent true amounts or nines complements of amounts, an accumulator, means under control of the cards for entering true amounts and nines complements into said accumulator, means for resetting the accumulator, devices for entering elusive units into said accumulator, contacts adapted to be closed to make said devices effective, means for opening said contacts as an incident to a resetting operation, and means under control of the first complement card of a group for closing said contacts to make said devices effective with the second and succeeding complement cards of the group.

7. In a machine of the class described, a pair of balance accumulators, means for entering groups of true numbers and complements into said accumulators, a pair of devices one for each accumulator and adapted to enter elusive units with the complements entered in the accumulators, and means for disabling one of said devices as an incident to the entry of the first complement of a group.

8. In a record controlled machine, means for reading groups of true amounts and nines complements presented by the records, debit and credit balance accumulators, means under control of said reading means for entering the true amounts and nines complements into said accumulators, elusive unit entering devices cooperating with the accumulators to enter a unit with a nines complement, and means for disabling the device cooperating with the credit accumulator when the first nines complement of a group is added therein, said disabling means adapting the credit accumulator to indicate the nines complement of a credit balance.

9. In a record controlled machine, means for reading groups of true amounts and nines complements presented by the records, debit and credit balance accumulators, means under control of said reading means for entering the true amounts and nines complements into said accumulators, elusive unit entering devices cooperating with the accumulators to enter a unit with a nines complement, means for disabling the device cooperating with the credit accumulator when the first nines complement of a group is added therein, said disabling means adapting the credit accumulator to indicate the nines complement of a credit balance, printing devices comprising two sets of type one arranged complementary to the other, means for determining which accumulator is adapted to print the balance amount of a group as a true number, and means under control of said printing devices and determining means for taking a total at the end of a group and printing the balance as a true number.

10. In a perforated record controlled machine, means for reading a group of records containing perforations representing debit and credit amounts, the debits as true numbers and the credits as nines complements, debit balance and item accumulators, credit balance and item accumulators, means under control of said reading means for selectively entering the true numbers into the debit item accumulator and the nines complements into said credit item accumulator, and entering both true numbers and nines complements into both balance accumulators, means under control of special perforations in credit records and adapted to enter an elusive unit with each nines complement entered into the balance accumulators and the credit item accumulator, means for causing the omission of the elusive unit in the credit accumulators with the first nines complement entry, type members associated with said accumulators, the members for the credit accumulators being arranged in a nines complemental relation, means for determining which balance accumulator is adapted to print the balance as a true number, thereby disabling the other accumulator for printing, and means for taking a total at the end of a group to print a record of the debit and credit item totals and the balance.

HERMANN A. WEINLICH.
ULRICH KÖLM.